July 22, 1930. J. H. McDONNALL Re. 17,745

SACK LOADING SYSTEM

Original Filed April 14, 1928

INVENTOR.
Joseph H. McDonnall
BY Warren D. House
His ATTORNEY.

Reissued July 22, 1930

Re. 17,745

UNITED STATES PATENT OFFICE

JOSEPH H. McDONNALL, OF KANSAS CITY, MISSOURI

SACK-LOADING SYSTEM

Original No. 1,672,767, dated June 5, 1928, Serial No. 270,076, filed April 14, 1928. Application for reissue filed May 2, 1930. Serial No. 449,335.

This invention relates to a method of loading sacks in freight cars, the general object of the invention being to so pile the sacks that they will remain in position during transit, without rubbing against the sides of the car so that there is no danger of the sacks being torn and it is not necessary to use door boards, grain doors or packing material, such as excelsior.

This method also prevents damage from bolt heads and the like in the walls of the car and prevents the load from shifting. The sacks can be easily checked and the contents of the sacks are prevented from deteriorating by becoming wet.

In the drawing:—

Figure 1:
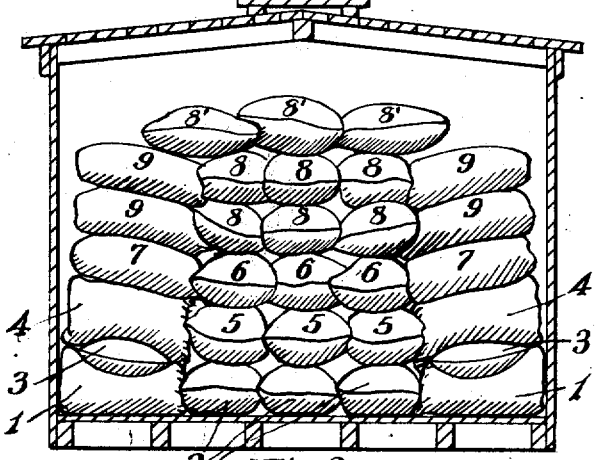
Figure 1 is a transverse sectional view through one end of the car, showing how the sacks are piled in the car.

As shown in Figure 1, the sacks are piled in the car at the ends thereof by first placing a pair of sacks 1 transversely at each side of the car, the sacks being placed on edge with their closed ends against the walls of the car. The space between the two pairs of sacks is then filled in with sacks 2 placed on their sides, the tops of these sacks being placed against the end of the car. A sack 3 is then placed lengthwise on each pair of sacks 1 so that each sack 3 extends at right angles to the sacks 1. Each sack 3 is placed on its side intermediate the ends of the sacks 1. Then a pair of sacks 4 is placed on edge on each sack 3, these sacks 4 being arranged the same as the sacks 1. The space between the two pairs of sacks 4 is filled with the sacks 5, which have their sides resting on the sacks 2. Then another row of sacks 6 is placed on the sacks 5. A pair of sacks 7 is then placed flat on each pair of sacks 4, with the tops pushed against the end sacks of the row of sacks 6.

Then other rows of sacks 8 are placed flat on the center rows and pairs of sacks 9 are placed on the sacks 7 in the same position as the sacks 7, these sacks 9 being pushed firmly against the end sacks of the central rows 8, as shown in Figure 1, so that the sides of the pile or tier of sacks slope inwardly, as shown in Figure 1. This arrangement is continued to a point adjacent the top of the car and then other sacks can be placed in a pyramid on the top row composed of the sacks 8 and 9, as shown at 8′. The next tier is similarly formed and tier after tier added until the sacks reach the central part of the car which forms a passage between the doorways.

Figure 2:
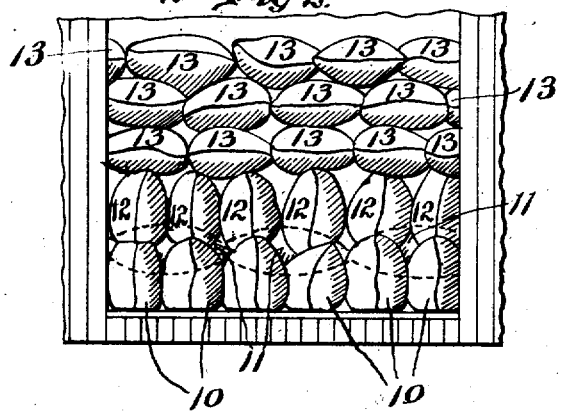
Figure 2 is a view looking into the car door.

The sacks adjacent one doorway are piled as shown in Figure 2. The first row of sacks, shown at 10, is placed on edge and extends transversely of the car, with the end sacks in the row abutting the bottom sacks of the inner tiers of sacks piled in the ends of the car, as shown in Figure 1. Sacks 11 are then placed lengthwise and flat on the middle portions of the sacks 10 and then a row of sacks 12 is placed edgewise on the stringer sacks 11. Then rows of flatly placed sacks 13 are placed on the sacks 12. The rows of sacks 13 must be drawn in slightly from the doorway toward the center of the car. The next tier of sacks is composed of sacks placed on their sides, one directly over the other from the bottom row to the top row. The bottom of this second tier should be held back far enough so that the sacks in the top rows of this second tier will touch the upper row of sacks 13 in the first tier as this first tier tips in at the top so that there is no danger of the first tier falling out of the doorway when the door is opened.

The last tier of sacks placed in the opposite doorway has its sacks arranged as shown in Figure 2 so that the sacks are piled in each doorway in the same manner.

Thus I have provided a simple manner of piling sacks in a car, which prevents shifting of the sacks so that they will remain in position during transit and they will not be damaged by rubbing against the sides of the car or against bolt heads, nails or the like in said sides.

The sacks can be easily checked and there is no need to use side door boards, grain doors or excelsior.

In the foregoing description I have described an order of succession in which the several sacks of a load may be piled in the car, as by piling at each end of the car a tier transverse to the length of the car and to the top of the tier, and then consecutively forming similar transverse tiers until the sacks reach the passage between the doorways.

Then a tier of sacks is piled adjacent to one doorway, said tier extending longitudinally of the car and abutting at its ends against the sacks which have been piled in the end portions of the car. Then similar tiers extending longitudinally of the car are consecutively piled until the opposite doorway is reached.

This order of succession in the individual piling of the sacks in the car affords an easy and convenient way of loading the car, but it is the positions of the sacks in the load, and not the particular sequence, in point of time, in which the sacks are placed in these positions, which prevents the sacks from shifting laterally against the sides of the car, and from falling out through the doorways. The predominant and important feature of my invention is the positions occupied by the sacks in the load, not restricted by the particular order of succession in which the sacks are respectively placed in these positions, as such order of succession in piling may be largely varied, within the scope of the appended claims, without departing from the spirit of my invention.

The disposal of the stringer sacks 3 and 11 transversely on their edges or narrow sides, or on the wide sides, as shown in Figs. 1 and 2, between the sacks 1 and 10 of the bottom rows and the sacks 4 and 12 of the third rows of the outer tiers, the said sacks 1 and 10 and 4 and 12 being disposed transversely of the car on their edges or narrow sides, serves to bind together the sacks of the three lower rows in each outer tier. A firm anchorage for the pile is thus provided which prevents its lateral shifting, with consequent liability of the sacks being damaged by rubbing against the sides of the car, and which eliminates the need of door boards or grain doors across the doorways to prevent the sacks from falling out, when the side doors of the car are opened.

What I claim is:—

1. The herein described method of piling filled sacks consisting in placing a pair of sacks on edge at each side of the pile, the sacks extending longitudinally of the pile, then filling the space between the two pairs with transversely arranged sacks placed flat on their sides, then placing a sack transversely on the middle portions of each pair of sacks at the sides of the pile, then placing a second pair of sacks on each sack resting on the first pairs, the sacks of the second pairs being placed on edge and paralleling the sacks of the first pairs, then placing a second row of flat sacks on the first row of flat sacks, then placing other rows of flat sacks on the second row, with the sacks at the ends of these other rows resting on their sides and extending lengthwise of the rows and pushed inwardly against the intermediate sacks of the rows whereby the sides of the pile taper upwardly.

2. The herein described method of piling sacks in a freight car, consisting in arranging the sacks in tiers extending transversely of the length of the car, each tier having a pair of sacks at each end thereof, the sacks of each pair extending lengthwise of the tier and resting on their edges with their bases against the sides of the car, then filling the space between the two pairs of sacks with a row of sacks resting on their sides and extending at right angles to the pairs of sacks, then placing a sack on its side on the middle portions of each pair of sacks at the ends of the tier, said sack extending at right angles to the pair of sacks, then placing a pair of sacks on each sack placed on the other pair of sacks, the second pair of sacks being placed on edge and extending lengthwise of the tier, with their tops facing inwardly, then placing a second row of flat sacks on the first row of flat sacks, then placing other rows of flat sacks on the first rows, with the end sacks of these other rows resting on their sides and extending lengthwise of the tier, with these end sacks pushed inwardly so that the ends of the tier taper upwardly, the sacks at the center of the car in the passageway between the doorways being placed in tiers with each outer tier consisting of a bottom row of sacks extending transversely of the car and placed on their edges, a second row of sacks extending lengthwise of the car and resting on the middle portions of the first row, then placing a third row of sacks on the second row, the sacks of the third row being placed on their edges and extending transversely of the car and then placing the upper rows of sacks on their sides, the intermediate tiers being placed on the sides with the upper rows of sacks of the outer tiers pushed inwardly.

3. The herein described method of piling filled sacks, consisting in forming in the passage between the doorways of a freight car a pile of filled sacks having respectively adjacent to said doorways two outer tiers extending lengthwise of the car, and intermediate sacks between said outer tiers, each of said outer tiers consisting of a bottom row the sacks of which extend transversely of the car upon their narrow sides, a second row the sacks of which extend lengthwise of the car and rest on the sacks of said bottom row, a third row the sacks of which rest on their narrow sides on and transverse to the sacks of said second row, and upper rows one row upon the other and upon the sacks of said third row, the sacks of said upper rows being placed on their sides and abutting against said intermediate sacks.

4. The herein described method of piling filled sacks, consisting in forming in the passage between the doorways of a freight car a pile of filled sacks having respectively to said doorways two outer tiers extending lengthwise of the car, and intermediate sacks between the outer tiers, each of said outer tiers consisting of a bottom row the sacks of which extend transversely of the car upon their narrow sides, a second row the sacks of which extend lengthwise of the car and rest on the sacks of the bottom row, a third row the sacks of which rest on their narrow sides on and transverse to the sacks of said second row, and upper rows one row above the other and upon the sacks of said third row, the sacks of said upper rows being placed on their sides transversely of the car and abutting against said intermediate sacks, the outer ends of the sacks of each of said upper rows being disposed further inward than the outer ends of the sacks in the row next below.

5. The herein described method of piling filled sacks in a car, consisting in forming a pile having two outer tiers at opposite sides respectively of the pile and extending lengthwise of the car, and intermediate sacks between said outer tiers, each outer tier comprising a bottom row the sacks of which are disposed side by side on their narrow sides transversely of the car, a second row the sacks of which rest on and are transverse to the sacks of said bottom row, a third row the sacks of which rest on their narrow sides on and transverse to the sacks of said second row, and other rows the sacks of which are transverse to the car and abut at their inner ends against adjacent ones of said intermediate sacks, said other rows being disposed one above the other on said third row.

6. The herein described method of piling filled sacks in a car, consisting in forming a pile having two outer tiers at opposite sides respectively of the pile and extending lengthwise of the car, and intermediate sacks between said outer tiers, each outer tier comprising a bottom row the sacks of which are disposed side by side on their narrow sides transversely of the car, a second row the sacks of which rest on and are transverse to the sacks of the bottom row, a third row the sacks of which rest on their narrow sides on and transverse to the sacks of said second row, and other rows the sacks of which are transverse to the car and abut at their inner ends against adjacent ones of said intermediate sacks, said other rows being disposed one above the other on said third row, the outer ends of the sacks of each of said other rows of each outer tier being further inward than the outer ends of the sacks in the row next below.

In testimony whereof I have signed my name to this specification.

JOSEPH H. McDONNALL.